United States Patent Office 3,446,399
Patented May 27, 1969

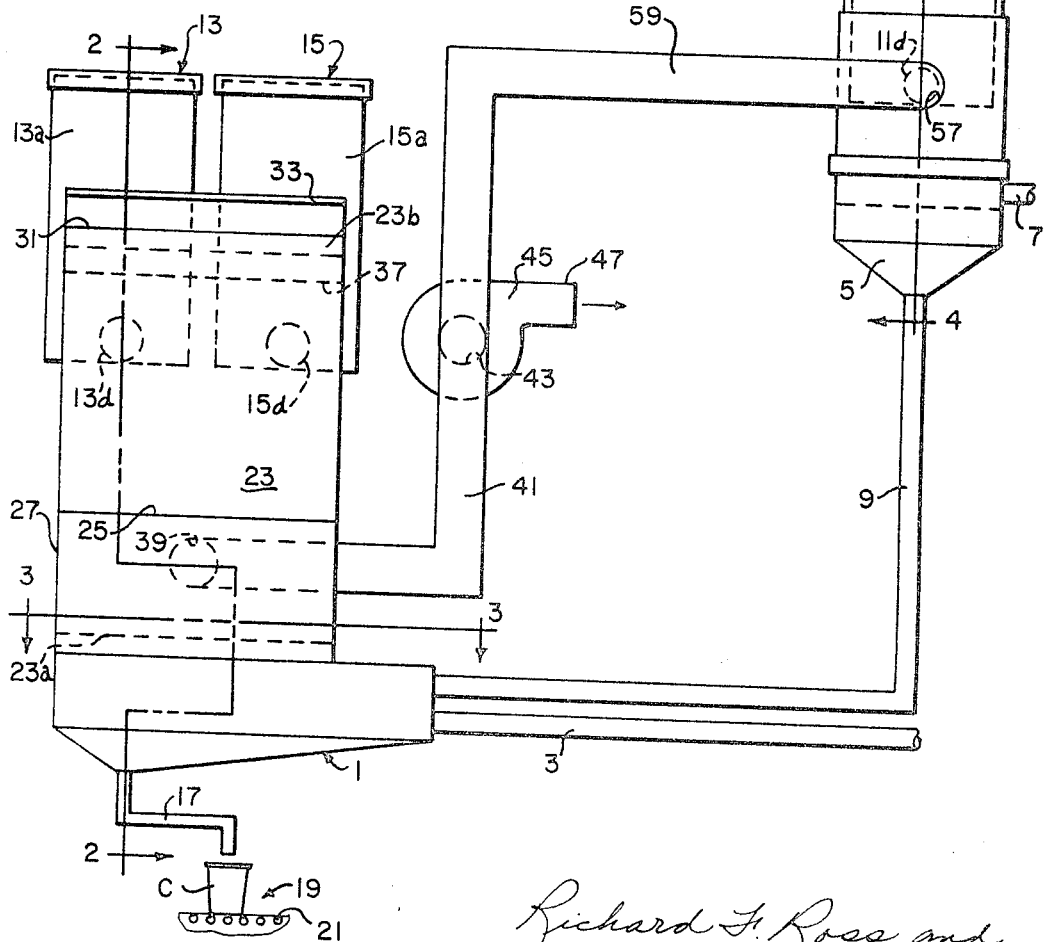

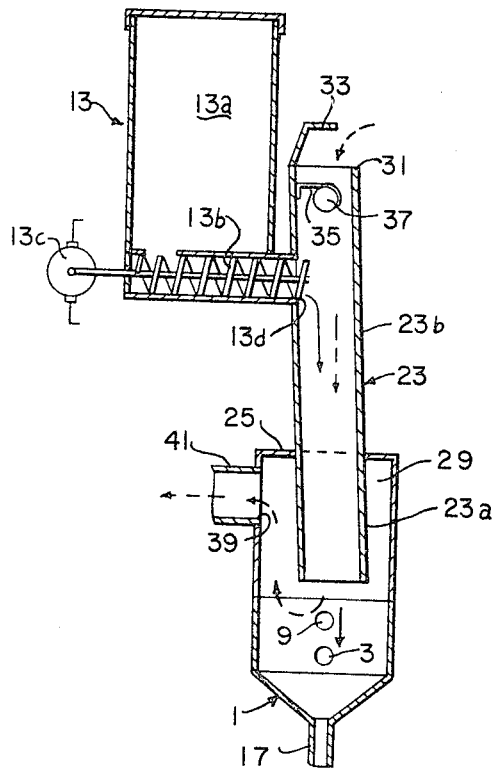
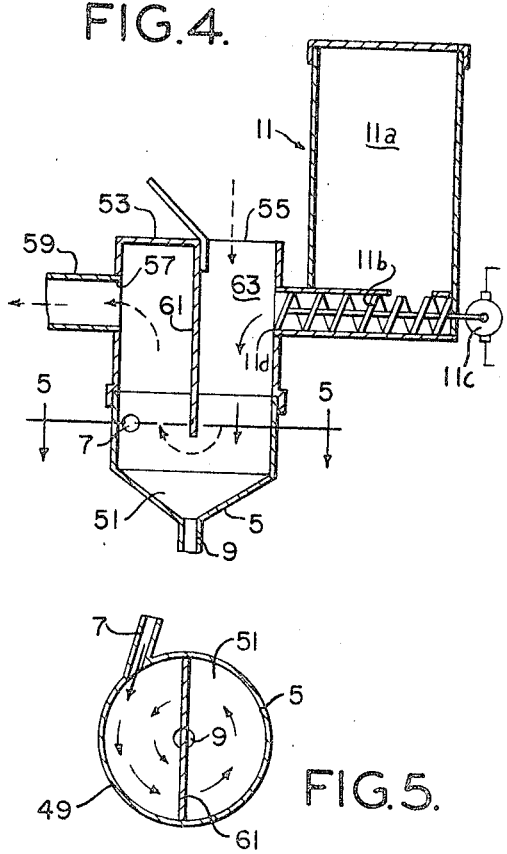
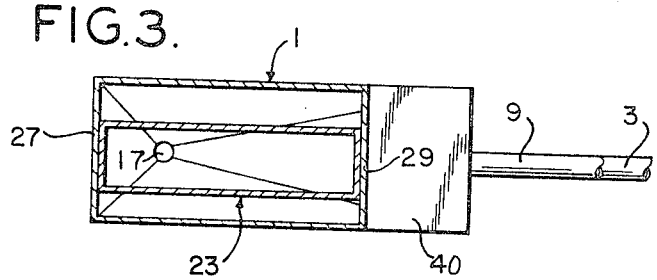

3,446,399
DISPENSING APPARATUS
Richard F. Ross, Oak Lawn, and Calvin K. K. Yan, Chicago, Ill., assignors to UMC Industries, Inc., St. Louis, Mo., a corporation of Delaware
Filed June 9, 1967, Ser. No. 645,005
Int. Cl. B67d *5/56, 5/62*
U.S. Cl. 222—129.1         7 Claims

ABSTRACT OF THE DISCLOSURE

Hot beverage dispensing apparatus brews and vends coffee, tea and other hot beverages, either with or without the addition of sugar and/or cream according to the purchaser's selection. A hot liquid (e.g., water or a previously brewed beverage) and a dry ingredient (e.g., instant coffee or tea, or sugar and/or powdered cream) are brought together in a bowl where they are mixed and then delivered to a cup station. A blower produces an air stream which moves downwardly into the mixing bowl, around a baffle in the bowl, upwardly in the bowl, and then out of the bowl. The dry ingredients are stored in dispensers and metered through outlet spouts directly into the air stream above the mixing bowl. The baffle prevents them from being sucked out of the mixing bowl with the stream of air. The stream of air avoids upward flow of steam and hot vapors from the mixing bowl past the outlet spouts of the dispensers, thereby preventing caking of the dry ingredients at the outlet spouts.

Background of the invention

This invention relates to hot beverage dispensing apparatus for brewing and vending coffee, tea and other hot beverages with or without the addition of cream and/or sugar and, more particularly, to such vendors wherein a hot liquid may be mixed with a dry ingredient during operation of the vendor.

An example of such a vendor may be found in the copending, coassigned United States patent application of Harry H. Pryor et al. for Hot Beverage Merchandisers, Ser. No. 615,413, filed Feb. 13, 1967. Essentially, the merchandiser disclosed therein operates by supplying hot water from a hot water tank to a bowl for mixing with dry powdered tea. This hot tea, or hot coffee from a coffee brewer, is delivered to a second bowl where dry powdered cream and/or sugar may be added according to the purchaser's selection. The dry ingredients are provided to both bowls through outlet spouts of dispensers located above the bowls. A problem existing in merchandisers of this class is that of clogging of the dispenser spouts due to caking of the dry ingredients in the spouts when hot vapors rise from the bowls past the spouts. The dry ingredients are very hygroscopic and therefore readily pick up moisture from the steam, causing the ingredients to cake, become lumpy and clog the outlet spouts of their dispensers. Merchandisers of this class are also subject to dusting, i.e., dispersion of dry ingredients on various portions of the merchandiser between the dispenser spouts and the lines leading from the mixing bowls.

Summary of the invention

Accordingly, among the several objects of the invention may be noted the provision of dispensing apparatus of the class described which avoids clogging of the spout of a dry ingredient dispenser due to hot vapors caking the dry ingredient in the spout; and the provision of a vendor of this class which is less subject to dusting than prior vendors of this class. Other objects and features will be in part apparent and in part pointed out hereinafter.

Dispensing apparatus of the invention comprises a mixing bowl having a line for delivering a hot liquid to the bowl. Air is delivered into the mixing bowl through an air inlet passage. A dispenser for supplying a dry ingredient to the bowl has an outlet spout communicating with the inlet passage between its ends whereby the dry ingredient is delivered to the bowl through the passage. Air is exhausted from the mixing bowl through an air outlet passage and means are provided for inducing a flow of air through the mixing bowl from the inlet passage to the air outlet passage. The bowl is substantially closed to the entrance of air except through said passages. Means is provided in the bowl between the two passages which comprises a baffle for effecting downward flow of air past the outlet spout toward the surface of the liquid in the bowl and thence upward to the air outlet passage.

Brief description of the drawings

FIG. 1 is a diagram of dispensing apparatus of this invention;
FIGS. 2 and 3 are sections taken on lines 2—2 and 3—3, respectively, of FIG. 1;
FIG. 4 is a section taken on line 4—4 of FIG. 1; and
FIG. 5 is a section taken on line 5—5 of FIG. 4.
Corresponding reference characters indicate corresponding parts throughout the several views of the drawings.

Description of the preferred embodiments

Referring to FIG. 1 of the drawings, dispensing apparatus of this invention comprises a main mixing bowl 1 which receives brewed coffee from a coffee brewer (not shown) through a delivery line 3. The dispensing apparatus also has a second mixing bowl 5 for brewing hot tea or decaffeinated coffee from instant tea or coffee. A line 7 extends from a hot water tank (not shown) to the bowl 5 and a line 9 delivers brewed tea or decaffeinated coffee from bowl 5 to bowl 1. Dry powdered instant tea or instant coffee is delivered to mixing bowl 5 from a conventional dispenser 11 which comprises a hopper 11*a*, an auger 11*b* and an electric motor 11*c* for driving the auger. Operation of the motor is controlled so that a measured quantity of instant tea or instant coffee is discharged through an outlet spout 11*d* during a cycle of operation.

Dispensers 13 and 15 for powdered cream and sugar, respectively, provide these dry ingredients to the mixing bowl 1 with coffee or tea according to the purchaser's selection. The dispensers are of conventional type comprising hoppers 13*a* and 15*a*, respectively, and augers designated 13*b* and 15*b*, respectively. The augers are driven by electric motors such as shown at 13*c* in FIG. 2 and each provides a measured amount of the dry ingredient from the hopper to the mixing bowl through outlet spouts 13*d*, 15*d* when the respective motor is energized during a cycle of operation.

A line 17 extends from the bottom of mixing bowl 1 to a cup station 19 for delivery of the coffee or tea (with or without cream and/or sugar) to a cup C which is delivered to the cup station by a conventional cup dispenser (not shown). The cup rests on the usual grille 21 which is drained to a waste can. The portions of the dispensing apparatus described above are disclosed in the beforementioned Pryor et al. copending patent application. The various mixing and vending operations may be controlled in response to the purchaser's selection as described in said application.

Referring now to FIGS. 1–3, a chute 23 has a lower portion 23*a* which projects down into the upper portion of mixing bowl 1 through the top closure 25 of the mixing bowl and the chute has an upper portion 23*b* which projects out of the mixing bowl and extends upward above top closure 25. The chute is secured to the mixing bowl in any suitable manner and the portion 23a thereof extends transversely entirely across the bowl from one side 27 of the bowl to the other side 29 thereof as shown in FIGS. 1 and 3. The lower edge or end of the chute is above the normal level of liquid flowing through the bowl to permit the desired path of air flow described later. The upper portion 23b of the chute has an opening 31 constituting an air inlet through which air enters the chute for downward flow through the chute into the mixing bowl. Opening 31 is partially closed by a lid 33. A bracket 35 mounts a heating element 37 in the upper portion of the chute upstream of spouts 13d, 15d so that the air entering the mixing bowl can be heated, thereby drying the air passing the outlet spouts.

The dispenser outlet spouts 13d communicates with the upper portion 23b of the chute between opening 31 and bowl 1 so that the dry powdered cream is delivered into the chute and carried into the bowl with the stream of air passing through the chute from opening 31. Similarly, dry powdered sugar from dispenser 15 is metered through its outlet spout 15d into the upper part 23b of the chute for delivery to bowl 1 with the stream of air. Delivery of the dry ingredients to the bowl is illustrated by the solid-line arrows in FIG. 2.

The bowl 1 has a lateral air outlet opening or port 39 which is located adjacent the top 25 of the bowl and between the top of the bowl and the lower end of chute 23 so that the lower portion 23a of the chute comprises a baffle which effects downward flow of air past the outlet spouts 13d, 15d toward the surface of the liquid in the bowl and thence upward to the outlet opening 39 of the bowl. The opening 39 is spaced from the chute as shown in FIG. 2, to permit flow of air between the chute and the wall of the bowl containing the opening. A cover 40 (FIG. 3) closes the top of the portion of the bowl that projects beyond side 29 of the bowl. The bowl 1 is substantially closed to either the entrance or exit of air except through inlet 31 at the top of the chute and the outlet opening 39.

A conduit 41 connects the outlet opening 39 with the suction or vacuum side 43 of a conventional blower 45 so that operation of the blower induces flow of a stream of air from the chute inlet 31 through mixing bowl 1 to the exhaust or outlet port 39 for subsequent discharge through an exhaust opening 47 of the blower. This is shown by the dotted-line arrows in FIG. 2 The blower may be operated continuously or it may be cycled on and off.

Referring now to FIGS. 1, 4 and 5, mixing bowl 5 comprises a generally cylindrical wall 49 which communicates with line 9 through a conical funnel portion 51. The top of the bowl is partially closed by a cover 53 of substantially semicircular shape which leaves a substantially semicircular inlet opening 55 at the top of the bowl. Air is exhausted from the bowl through an outlet opening 57 which communicates through a conduit 59 with the suction side 43 of the blower 45. Air travel is illustrated by the dotted-line arrows in FIG. 4.

A plate 61 depends from the cover 53 adjacent opening 55 to a point beneath outlet opening 55. The plate extends entirely across the bowl and is secured along its side edges to the cylindrical part 49 of the bowl. Plate 61 comprises a baffle between the inlet openings which effects a downward flow of air past the outlet spout 11d toward the surface of the liquid in the bowl and thence upward to the outlet opening. The baffle plate 61 and the semicylindrical portion of wall 49 opposite the outlet opening jointly define an air inlet passage designated 63 through which air enters the mixing bowl. The lower edge of the plate is above the normal level of liquid in bowl 5.

Dry powdered coffee, tea or the like is delivered from dispenser 11 through outlet spout 11d into passage 63 between opening 55 and the lower end of the baffle plate 61 so that this dry ingredient is carried downwardly into the bowl with the stream of air traveling through passage 63. Movement of the dry ingredient is shown by the solid-line arrows in FIG. 4. The mixing bowl 5 is substantially closed to the entrance or exit of air except through opening 55. When blower 45 is operating, it induces a flow of air through the mixing bowl as shown by the arrows in FIG. 4.

As shown in FIG. 5, the line 7 is preferably connected generally tangentially to the mixing bowl 5 so that hot water delivered to the mixing bowl travels in a helical path around the conic portion 51 of the bowl as shown by the arrows in FIG. 5. This swirling motion provides good mixing action and insures that the hot liquid covers substantially the entire lower surface of the bowl, thereby insuring mixture of the liquid with all of a charge of the dry ingredient irrespective of the point at which the dry ingredient contacts the lower portion of the bowl. Lines 3 and 9 are preferably connected to the mixing bowl 1 in order to produce a similar swirling motion.

Operation of the dispensing apparatus is as follows:

It will be assumed that the blower 45 is continuously operated. If the purchaser selects black coffee, it can be provided either from the brewer (not shown) through line 3 to mixing bowl 1 or from mixing bowl 5 through line 9. In either event the coffee from bowl 1 flows through line 17 to the cup C at the cup station 19.

If the purchaser selects coffee with cream, then motor 13c is energized for a time sufficient to rotate auger 13b and meter a measured quantity of powdered cream from dispenser 13 into the upper portion 23b of the chute. Operation of blower 45 induces a flow of air into the opening 31 at the top of the chute, downwardly past the heater 37 and spout 13d into the mixing bowl and then around the lower baffle portion 23a of the chute and up into the conduit 41 as shown by the dotted-line arrows in FIG. 2. The dry powdered cream from dispenser 13 is carried by the flow of air downwardly into the bowl 1 and is discharged thereinto from the chute at a level which is beneath the outlet opening 39. This location of the lower end of the baffle beneath the outlet opening prevents the powdered or dry cream from being sucked out of the mixing bowl through the outlet port 39. The sequence of operation is timed so that the hot liquid arrives at the bowl prior to the time the dry ingredient reaches the bowl. Thus the dry ingredient provided to the bowl drops onto the surface of the hot liquid in the bowl. The liquid is preferably swirling in the bottom of the bowl to affect rapid and complete mixing of the powdered and liquid ingredients. The resulting hot coffee with cream is then provided through line 17 to the cup C.

In the event the purchaser selects a beverage containing sugar, then sugar is metered into the chute 23 through the spout 15d of dispenser 15 and mixed with the hot liquid in the mixing bowl 1 in the same manner as described for mixing powdered cream with coffee. Similarly, powdered sugar and cream can be simultaneously provided to the mixing bowl and mixed with a hot liquid if the purchaser makes such a selection.

Operation of blower 45 also induces a flow of air through the mixing bowl 5 as shown by the arrows in FIG. 4. If the customer operates the vendor to obtain a cup of tea or if the coffee is to be brewed in bowl 5, then hot water is provided to bowl 5 through line 7 and it swirls about the lower portion of the bowl as shown in FIG. 5. Motor 11c is energized for a time sufficient to operate the auger 11b to meter a measured quantity of dry instant coffee or tea from dispenser 11 into the passage 63. The dry ingredient is carried by incoming air downwardly through passage 63 into the liquid in the bowl. The swirling liquid quickly mixes with the dry ingredient and then flows through line 9 into bowl 1. This beverage can be mixed with cream and/or sugar in the manner previously described, or it can be delivered to the cup without the addition of either cream or sugar. The baffle 61 induces the desired downward movement of the dry ingredient and, because the lower end of the baffle is beneath the outlet port 57, the dry ingredient is not sucked up into the outlet port.

The dry ingredients from dispensers 11, 13 and 15 are metered directly into the air stream entering the mixing bowls and they are carried by the air stream directly into the liquid. This prevents any significant dusting in either of the mixing bowls.

Dispensing apparatus in previous vendors of this class have been subject to caking of the dry hygroscopic beverage ingredients in the outlets of the spout by the dry ingredients combining with hot vapors rising from the mixing bowls past the outlet spouts. This causes the ingredients to become lumpy and clog the outlet spouts of the dispensers as well as creating other problems. These problems are eliminated by the dispensing apparatus of the invention since the flow of all through the mixing bowls induced by operation of the blower creates a downdraft of air past the outlet spout for carrying the dry ingredients downwardly into the bowl and simultaneously prevents the hot vapors from rising past these outlet spouts. The hot vapors are carried away through the outlet opening to the blower. The air flowing past the dispenser spouts can be heated and thus dried by heater 37 to further aid in the elimination of the beforementioned clogging problems. While the heater is not shown in connection with the mixing bowl 5, it will be understood that a heater can be provided across passage 63 if so desired.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be illustrative and not in a limiting sense.

What is claimed is:

1. Dispensing apparatus comprising:
a mixing bowl having a generally cylindrical upper portion and a conic lower portion, a line connected to the conic portion of the bowl for delivering beverage from the bowl, the bowl having an air inlet opening in the top thereof through which air can be delivered into the bowl, said bowl having an outlet opening through which air can be exhausted from the bowl, a baffle depending from the top of the bowl between the inlet and outlet openings and extending entirely across the cylindrical portion of the bowl, through the center portion of the bowl, whereby air flowing through the bowl between the openings therein must pass from the inlet opening and beneath the baffle before leaving via the outlet opening, said baffle and the wall of the bowl opposite the outlet defining an air inlet passage through which air is delivered into the bowl,
a dispenser for supplying a dry ingredient to the bowl, the dispenser having an outlet spout projecting into said air inlet passage of the bowl between said inlet opening therein and the bottom of said baffle,
the bowl being substantially closed to the entrance or exit of air except through its air inlet and outlet openings,
blower means having an air inlet side connected to the air outlet opening of said bowl for inducing flow of air through the mixing bowl from its air inlet opening to its air outlet opening,
and a line for bringing a hot liquid to the mixing bowls.

2. Dispensing apparatus as set forth in claim 1 wherein the hot liquid line is connected tangentially to the bowl so that liquid delivered to the bowl travels in a helical path around the conic portion to swirl the liquid in the bowl.

3. Dispensing apparatus comprising:
a mixing bowl,
a chute secured to the mixing bowl, said chute having an upper portion projecting above the top of the mixing bowl and having a lower portion projecting down into the mixing bowl through the top thereof, said upper portion of the chute having an opening through which air can enter the chute for delivery into the mixing bowl,
a dispenser for supplying a dry ingredient to the mixing bowl, the dispenser having an outlet spout projecting into said upper portion of said chute between the opening in the chute and the bowl whereby the dry ingredient is delivered to the bowl through the chute,
the bowl having an air outlet opening between the top of the mixing bowl and the lower end of the chute so that the lower portion of the chute in the bowl comprises a baffle for deflecting downwardly air flowing through the mixing bowl between the chute and the outlet opening,
a second mixing bowl,
the second bowl having an air inlet opening in the top thereof through which air can be delivered into the second bowl, said second bowl having an outlet opening through which air can be exhausted from the mixing bowl, a baffle depending from the top of the second bowl between the inlet and outlet openings and extending substantially entirely across the bowl whereby air flowing through the second bowl between the openings therein must pass from the inlet opening and beneath the baffle before leaving via the outlet opening, said baffle and the wall of the second bowl opposite the outlet opening defining an air inlet passage through which air is delivered into the second bowl,
a second dispenser for supplying a dry ingredient to the second bowl, the second dispenser having an outlet spout projecting into said air inlet passage of the second bowl between said inlet opening therein and the bottom of said baffle,
said first and second mixing bowls being substantially closed to the entrance or exit of air except through their respective air inlet and outlet openings,
blower means having an air inlet side connected to the air outlet openings of said bowls for inducing flow of air through the mixing bowls from their respective air inlet openings to their respective air outlet openings,
and lines for bringing a hot liquid to each of the mixing bowls, and a line for bringing liquid from the second bowl to the first bowl.

4. Dispensing apparatus as set forth in claim 3 further comprising a heating element positioned in said chute between the opening in the upper portion thereof and the dispenser spout projecting into the chute for heating and thereby drying the stream of air passing the outlet spout.

5. Dispensing apparatus as set forth in claim 3 wherein a hot liquid line in at least one of the mixing bowls delivers hot liquid into said mixing bowl in a direction to cause swirling motion of the liquid beneath the inlet passage to affect quick and complete mixing of the hot liquid and dry ingredients provided to the bowl.

6. Dispensing apparatus comprising:
a mixing bowl having an inlet for delivery to the bowl of a hot liquid which is to receive a dry ingredient in the bowl and an outlet for flow of the liquid out of the bowl, said bowl having a top closure,
a chute extending down into the bowl through the top closure having an upper portion extending upward above the top closure and a lower portion extending down into the bowl with the lower end of the chute above the normal level of liquid flowing through the bowl, the upper portion of the chute having an air inlet through which air may enter the chute and flow downward through the chute into the bowl,
a dispenser for the dry ingredient having an outlet spout projecting laterally into the upper portion of the chute between the air inlet of the chute and the top closure of the bowl whereby the dry ingredient is delivered to the chute and thence downward confined in the chute to the bowl, the bowl having an air outlet located at a level above the lower end of the chute, blower means having an air inlet side connected to said air outlet of the bowl for inducing flow of air downward through the chute to the bowl and thence upward to the air outlet, the bowl being substantially closed against entry and exit of air except through the chute and said air outlet, whereby the dry ingredient delivered to the chute is swept downward by the flow of air in the chute confined in the chute into the bowl for separation from said air and for contact with the surface of liquid flowing through the bowl so as to minimize dry ingredient being sucked out through the air outlet, hot vapors from the liquid in the bowl being sucked out through the air outlet and thereby prevented from rising past the outlet spout.

7. Dispensing apparatus as set forth in claim 6 wherein the air outlet is a lateral outlet at one side of the bowl and the chute is spaced from said one side of the bowl to provide space for upward flow of air in the bowl from the lower end of the chute to the air outlet.

References Cited

UNITED STATES PATENTS

| | | | |
|---|---|---|---|
| 2,755,000 | 7/1956 | Parre | 222—129.4 |
| 2,843,293 | 7/1958 | Burgoyne | 222—129.4 |
| 2,954,145 | 9/1960 | McCauley | 222—129.4 |
| 2,977,026 | 3/1961 | Delgado | 222—129.4 |
| 3,300,094 | 1/1967 | Rockola | 222—129.4 |

ROBERT B. REEVES, *Primary Examiner.*

H. S. LANE, *Assistant Examiner.*

U.S. Cl. X.R.

222—146